United States Patent [19]

Moseley et al.

[11] Patent Number: 4,995,483

[45] Date of Patent: Feb. 26, 1991

[54] MOTOR POSITION FEEDBACK CONTROLLED ELECTRICALLY ACTUATED AIRCRAFT BRAKE

[75] Inventors: Douglas D. Moseley, Uniontown; Edgar J. Ruof, Akron, both of Ohio

[73] Assignee: Aircraft Braking Systems Corporation, Akron, Ohio

[21] Appl. No.: 451,691

[22] Filed: Dec. 18, 1989

[51] Int. Cl.$^5$ .............................................. B60T 13/24
[52] U.S. Cl. .................................. 188/162; 188/72.1; 244/111; 303/100
[58] Field of Search ............... 188/162, 157, 72.1; 303/100; 244/110 A, 111

[56] References Cited

U.S. PATENT DOCUMENTS

| | | | |
|---|---|---|---|
| 4,327,414 | 4/1982 | Klein | 188/162 X |
| 4,673,225 | 6/1987 | Kade | 303/100 |
| 4,860,859 | 8/1989 | Yamatoh et al. | 188/162 X |

Primary Examiner—George E. A. Halvosa
Attorney, Agent, or Firm—L. A. Germain

[57] ABSTRACT

This invention provides brake clamping and declamping in response to a position feedback controlled brake actuator in which an electric torque motor drives a rotating member of a reciprocating drive mechanism to axially move another member into out of engagement with a brake pressure plate of a multi-disk brake assembly. A microprocessor controller receives electric signals indicative of (i) a pilot's command for braking, (ii) a command for brake release and antiskid braking, (iii) the position of the torque motor rotor at any instant, and (iv) the initiation of brake clamping of the multi-disk brake. The controller generates a feedback control signal to the torque motor which adjusts the motor rotor position, in revolutions, to increase or decrease brake clamping in accordance with the pilot signal and to effect brake release in accordance with an overriding antiskid signal.

12 Claims, 2 Drawing Sheets

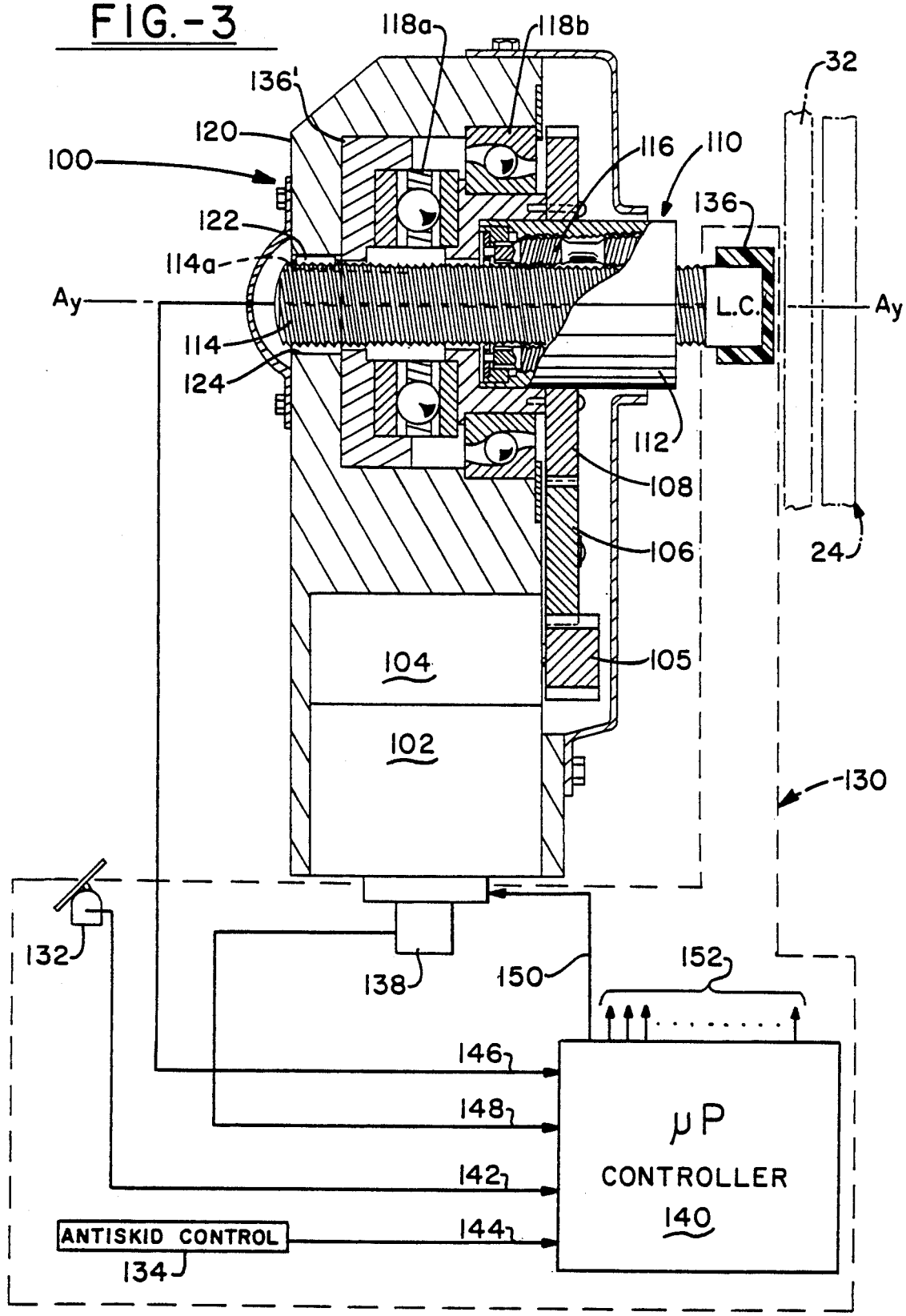

MOTOR POSITION FEEDBACK CONTROLLED ELECTRICALLY ACTUATED AIRCRAFT BRAKE

FIELD OF THE INVENTION

This invention pertains generally to aircraft brakes wherein brake actuation and release are achieved by electrical control as opposed to hydraulic control. The present invention provides an aircraft brake actuator in which clamping and declamping of a brake disk stack of frictional braking elements is achieved through a plurality of high torque electric motors which are responsive to electrical input signals. More specifically, the invention provides an electric motor position feedback controlled brake actuator which is useful for controlling brake clamping force, brake torque, and antiskid braking of an aircraft wheel.

Various configurations of reciprocating drive mechanisms are described and illustrated in U.S. Pat. No. 4,865,162 in which electric torque motors drive respective roller screw drive mechanisms such that a linear and axially moving member of the drive mechanism engages a brake pressure plate to effect a clamping force on the brake disk stack of the wheel and brake assembly for braking of a rotatable wheel. The instant invention is assigned to the assignee of the above-referenced patent and it may be applied to the various drive mechanisms described and illustrated in the patent. Therefore, the specification and drawings of U.S. Pat. No. 4,865,162 are included by reference herein.

From knowledge gained in the above-referenced patent, it will be apparent to those skilled in this art that the present invention may also be applied to ball screw type drive mechanisms. Ball screw drives are distinguished from roller screw drives by reason of the screw member of the mechanism being configured with spiral ball grooves about its surface while the coaxially mounted nut member carries a plurality of balls within its structure which ride in similarly spiralled ball grooves. A rotation of one of the coaxially mounted members will effect a linear and axial translation of the other member due to the interaction of the members with the groove-mounted balls. A particular ball screw drive of the type alluded to is described in U.S. Pat. No. 4,037,893 which is assigned to La Technique Integrale of Chambery, France, a primary producer of roller and ball screw drive mechanisms. These devices are marketed in the U.S. by SKF International under the tradename TRANSROL.

While the present invention will be described with respect to a particular roller screw drive mechanism, this is for the purpose of example only and the invention is not considered limited by the particular reciprocating drive mechanism shown and described in this specification. In this respect, the terminology "reciprocating drive mechanism" as used in this specification is considered to cover the various nut-and-screw drives which may be applied to convert a rotary motion of one member to a linear and axial translation of the other member.

In most presently known hydraulically operated aircraft braking systems, no feedback control signals are utilized. In some applications, hydraulic pressure is sensed and controlled to match brake pedal deflection at the pilot's control station. However, pressure feedback is not a direct measure of the brake actuator output force i.e., the clamping force which is exerted on the brake disk stack of the brake assembly. The main purpose of pressure feedback is to remove inconsistencies in the response of mechanical valves of the brake system. The valves are designed to port hydraulic pressure to the brakes as commanded by the pilot's brake pedal deflection. Some aircraft autobrake systems use accelerometers or other type of sensors to control braking so that a pre-set level of aircraft deceleration is achieved. These type systems control braking only at a few discrete deceleration levels and the actual brake clamping force is not sensed. In addition, the type of sensors which are used only produce very low amplitude signals which may become masked in noise and, therefore, may not even be useful.

The present invention applies the advantages of electrical brake actuation to electric motor position control in a feedback system in which a microprocessor controller accepts various input signals and these are indicative of (a) the amount of braking requested by the pilot as provided by the pilot's brake pedal deflection transducer, (b) the initiation of a brake clamping force on the brake disk stack as provided by a contact sensor means, (c) the position of the electric torque motor rotor as provided by a motor position resolver, and (d) a requirement for brake release as provided by the aircraft antiskid command. The microprocessor controller analyzes the various input signals and provides a feedback control signal to the torque motors of the brake assembly which then adjust their rotor positions, in revolutions, such that an increased brake clamping is effected in response to a pilot's request for increased braking effort, or, declamping of the brake disk stack is effected in response to a command for antiskid braking.

SUMMARY OF THE INVENTION

This invention provides a motor position feedback controlled electrically actuated brake as may be applied to an aircraft braking system which includes at least one rotatable wheel mounted in association with a brake disk stack of braking elements and a brake pressure plate to effect clamping of the disk stack for braking action, the invention comprising in combination:

(a) a source of electrical signals indicative of a pilot's request for braking effort;

(b) a source of electrical signals indicative of commanded antiskid braking;

(c) a reciprocating drive mechanism which converts a rotational motion of one member to a linear and axial motion of another member which is positioned for contacting engagement with the brake pressure plate;

(d) gear drive means mounted in association with the reciprocating drive mechanism to effect rotational motion of the one member;

(e) an electrically responsive torque motor mounted to drive the gear drive means;

(f) a rotor position resolver operatively mounted in association with the torque motor to provide an electrical output signal indicative of the motor rotor position at any instant in time;

(g) means mounted in operative association with the reciprocating drive mechanism to provide an electrical output signal indicative of an initiation of a brake clamping force on the brake disk stack; and (h) a microprocessor controller including a counter calibrated to count the number of torque motor rotor revolutions required to move the linearly and axially moving member of the reciprocating drive mechanism an axial distance equal to one hundred percent braking effort, said controller adapted to receive the signals indicative of a pilot's request for increased braking, commanded antiskid braking, the motor rotor position, and, the initiation of brake clamping to provide an output feedback signal to the torque motor which adjusts the motor position in rotor revolutions which is equal to the magnitude of the signal indicative of the pilot's request for braking and to adjust the torque motor reverse rotation when a brake release signal for antiskid braking is received.

BRIEF DESCRIPTION OF THE DRAWINGS

FIG. 3 is a plan view, partially in cross-section and partially diagrammatic, illustrating a motor position feedback controlled electrically actuated brake, the view being of but one of a plurality of such actuators which may comprise a complete brake actuation device.

DETAILED DESCRIPTION OF THE INVENTION

Figure 1:
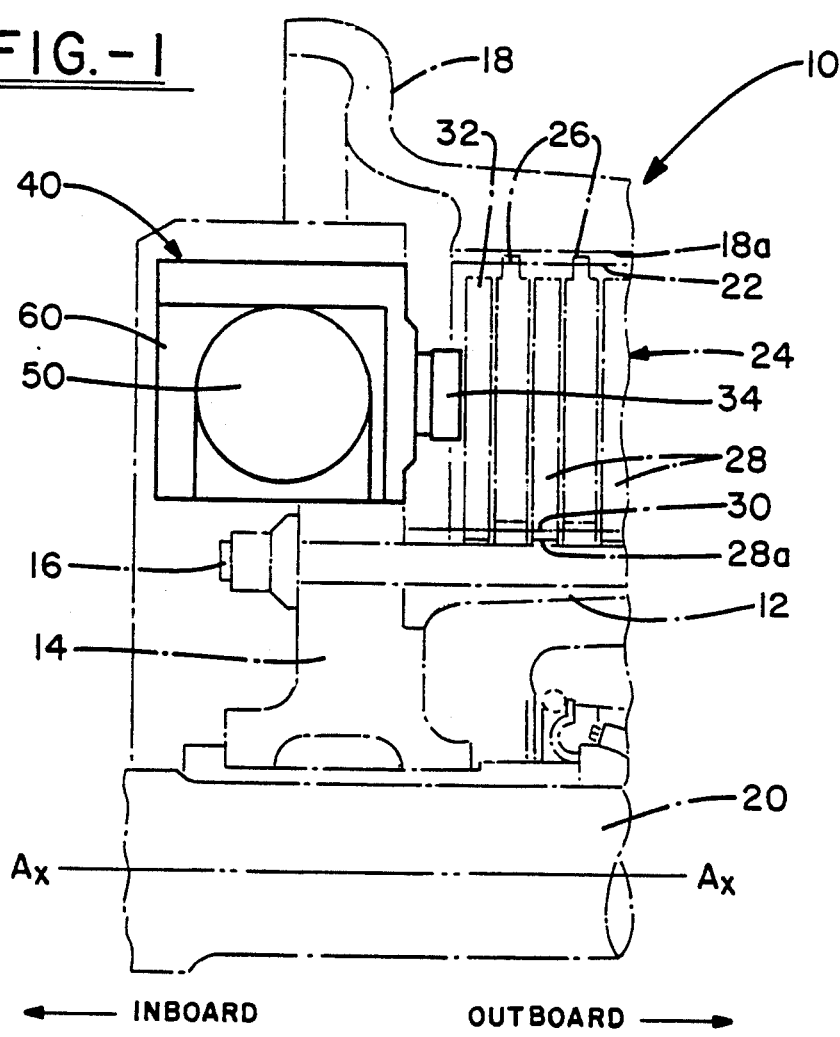
FIG. 1 is a partial cross-sectional view through one half of a wheel and brake assembly which is operative about an axis of rotation Ax—Ax and showing a reciprocating drive mechanism in solid lines as it may be associated with various conventional elements forming a wheel and brake assembly and these are shown in ghost via dot-dashed lines.

Referring to FIG. 1 of the drawings, a wheel and brake assembly is generally indicated by reference numeral 10, the conventional elements being shown in ghost lines and these include a torque tube 12 fixedly secured to a brake housing 14 by a plurality of bolts 16, and, a wheel rim 18 rotatably carried by an axle 20 and adapted for mounting of an inflatable tire thereon (the tire not shown in the drawing). The axis of rotation of the rotatable elements of the wheel and brake assembly 10 is indicated by line Ax—Ax.

The wheel rim 18 conventionally includes a plurality of drive keys 22 which are located about an inner peripheral surface as indicated at 18a. The drive keys 22 engage a plurality of rotatable brake disks 26 which are alternate disks of a brake disk stack generally indicated by reference numeral 24. The disks 26 are rotatable with the wheel 18 while other alternate disks of the disk stack are disks 28 and these are keyed about an inner peripheral surface 28a to a plurality of keys 30 formed about an outer surface of the torque tube 12. The brake disks 26,28 are functional to provide braking of the wheel 18 when they are clamped together in the axial direction by a forceful engagement imparted by a brake pressure plate 32 which is conventionally positioned at the inboard end of the brake disk stack 24. Of course, the disk stack clamping and compression is effected by the brake pressure plate 32 in conjunction with a back plate disk (not shown) or, by an outboard end radial extension (not shown) of the torque tube 12 in the well-known manner of such multi-disk brake assemblies.

Figure 2:
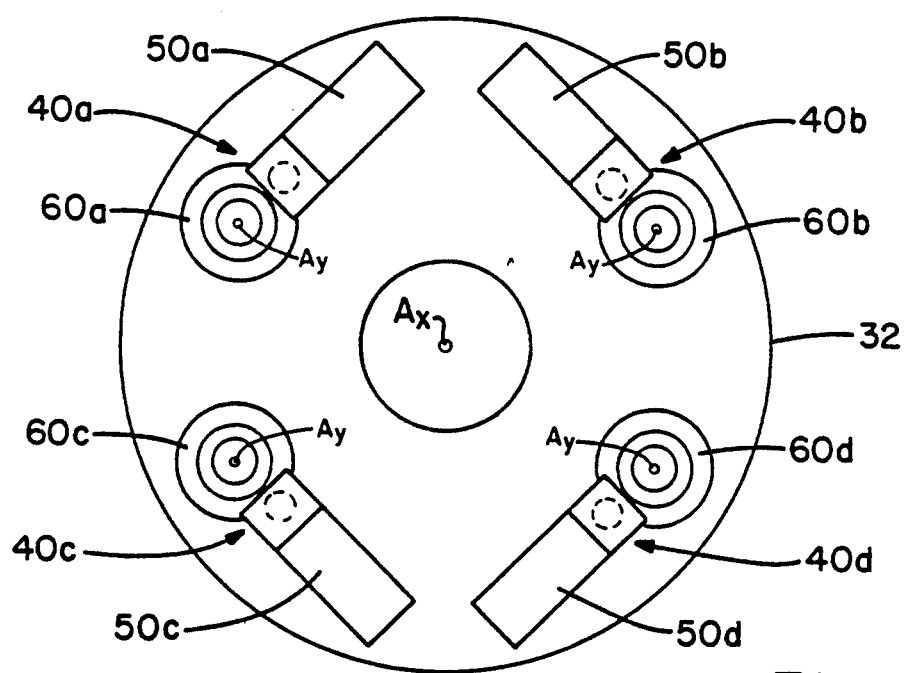
FIG. 2 is a diagrammatic elevational view of a wheel and brake assembly as may be taken from an inboard end toward an outboard end along the Ax—Ax axis.

The brake pressure plate 32 is also positioned for operative engagement with a plurality of electrically operated brake actuators 40 which are also shown in FIG. 2 as these may be positioned about the Ax axis in a housing 14. The actuators 40 function to clamp the brake disk stack 24 in the axial outboardly direction to stop the rotating wheel 18. Each brake actuator 40 comprises a high torque motor 50 which drives a ram member 34 of a reciprocating drive mechanism 60 into and out of contacting engagement with the brake pressure plate 32. Various mounting arrangements of the actuators may be used and a particular one is illustrated diagrammatically in FIG. 2. For example, brake actuators 40a-40d have respective torque motors 50a-50d and these are mounted to drive respective reciprocating drive mechanisms 60a-60d. The actuators 40 are positioned in a substantially balanced arrangement about the axis of rotation Ax. Obviously, the ram members 34 of the reciprocating drives 60a-60d effect an axial force on the brake pressure plate 32 and this force is directed in the outboardly direction of the wheel and brake assembly. As hereinbefore alluded to, the diagrammatic illustration of FIG. 2 is intended for the purpose of example only as other arrangements are possible and these will be dictated by the size and particular application of the brake assembly. In particular, the torque motors 50 may be sized to drive multiple reciprocating drives as opposed to a single reciprocating drive as illustrated in FIG. 2. Therefore, the present invention is not considered limited in any way to a particular arrangement of the brake actuators 40 or, by the numbers of such actuators which may by required for a specific aircraft application and/or wheel and brake assembly configuration.

Referring now to FIG. 3 of the drawings, an electrically controlled brake actuator is generally indicated by reference numeral 100. The brake actuator 100 comprises a reciprocating drive mechanism generally indicated at 110 which is driven by a high torque electric motor 102 through a gear set which includes a gear box 104 driving a pinion gear 105 for torque motor output. The pinion gear 105 operatively drives a gear 108 which is fixedly secured to the rotatable member of the reciprocating drive mechanism 110 through an idler gear 106. As earlier alluded to, either of the screw or nut members of the reciprocating drive may be adapted for rotation about the common axis indicated at Ay while the other of the members is non-rotating and is adapted for axial translation along the Ay axis.

The particular reciprocating drive mechanism 110 illustrated in FIG. 3 for the purpose of this description, is a roller screw drive having a nut member 112 which is mounted for rotation about the common Ay axis in a brake housing 120 while the screw member 114 is mounted for axial translation through the nut member to effect an engagement with the brake pressure pate indicated in ghost lines at 32. The axial translation of the screw member 114 is effected by a plurality of threaded rollers 116 which are mounted within the nut member structure between the nut and screw members. The rollers 116 may be mounted in a recirculating roller arrangement, or alternatively, in a planetary roller arrangement as shown in the drawing. The particular roller arrangement is not important to this invention and neither is the fact that a roller screw drive is shown. As alluded to earlier, the reciprocating drive mechanism 110 may as well comprise a ball screw drive.

Continuing with reference to FIG. 3, the nut member 112 is mounted for rotation via bearings 118a and 118b while the screw member 114 is mounted for axial translation through the nut member by reason of axially oriented slots 114a and at least one slot rider piece 122 which is mounted in a fixed position within a bore 124 in the brake housing 120. Slot rider pieces 122 allow the screw member to move axially but restrict any rotational motion. Clearly, a rotation of the nut member 112 which is fixed from any axial movement will result in an axial movement of the screw member 114 into and out of engagement with the brake pressure plate 32. It will, of course, be apparent that the alternative is possible wherein the screw member is fixed from any axial movement but is mounted for rotation about the common axis. In this arrangement, the nut member is mounted for axial translation along the screw member to engage the brake pressure plate. In view of the alternative arrangements, the present invention is not limited to a particular configuration suffice to say that such drive mechanism comprises two members, one fixed for rotation about the common axis while the other is mounted for axial translation with respect to the first member and for forceful engagement with the brake pressure plate.

In FIG. 3, a motor position feedback control system is also shown and it is generally indicated by reference numeral 130 as it may be applied to the electrically operated brake actuator 100. The control system 130 comprises a microprocessor controller 140 which is adapted to receive a plurality of input electrical signals from various sources and to analyze the signals such that an output feedback signal may be generated. The feedback signal controls brake clamping and release in accordance with the desires of the aircraft pilot or in accordance with an overriding command signal from the antiskid system for antiskid braking of the aircraft.

More specifically, the microprocessor controller 140 receives input signals 142 from a pilot's brake pedal position transducer 132, the signals being indicative of the amount of braking desired by the pilot. The controller 140 also receives electrical input signals 144 from an antiskid control 134, the signals including a brake release signal as determined by the antiskid system of the aircraft. The signals 144 are already available on the aircraft having antiskid capabilities and it is not an important consideration as to how or where such signals originate or are generated. It is already provided in such antiskid systems that a brake release command signal from the antiskid will automatically override the pilot brake pedal generated signal when the magnitude of the brake release signal meets predetermined levels.

The microprocessor controller 140 also receives electrical signals 146 from a contact sensor means 136 which is operatively mounted with respect to the reciprocating drive mechanism. In the particular showing of FIG. 3, the contact sensor means 136 is mounted at the outboard end of the axially translating screw member 114. The contact sensor means 136 may comprise any known type of switch means which is closable upon contacting engagement being made with the brake pressure plate. Preferably, the contact sensor means 136 comprises a load cell which exhibits a predetermined force threshold such that a signal 146 is generated when the force threshold is exceeded. It is important that the contact sensor output signal 146 is generated at the instant when brake clamping is initiated. In this respect, the limit of the load cell threshold is preestablished such that the brake pressure plate 32 is moved through an established clearance distance which exists when brake clamping is released. The clearance distance is a known factor and conventionally compensates for brake wear in the brake disk stack and it will remain the same irrespective of any changes in the brake wear. If, for example, a threshold force of one hundred pounds is required to move the brake pressure plate 32 through the clearance distance before brake clamping is initiated, then a signal 146 will only be generated when the load cell threshold of one hundred pounds is exceeded. It should be apparent from this, that a load cell type contact sensor may be positioned within the reciprocating drive mechanism where the clamping force is resisted. For example, the load cell sensor may be positioned at 136' where the clamping force is transmitted to the salt member 112 from the screw member 114 and thus also to the load cell sensor 136'.

It should be pointed out here that testing of an electric brake actuator 100 has established a known and fixed relationship between (a) the torque motor rotor position past a "zero" position when brake clamping is initiated, (b) the axial displacement of the reciprocating drive ram member and, (c) the actuator clamping force required for full one-hundred percent commanded braking. In this respect, it will be appreciated that when a brake clamping initiation signal 146 is received in the microprocessor controller 140 and the exact position of the motor rotor is known by reason of a signal 148 from the rotor position resolver 138, the controller may initiate a rotor revolution count from the "zero" position and then continue counting rotor revolutions until the required brake clamping effort is realized. For example, if the pilot command generates a pedal signal 142 indicative of a requirement for fifty percent of full brake clamping force, the controller will then send a power-on signal 150 to the torque motor 102 which also activates the reciprocating drive mechanism 110 such that the ram member moves into contacting engagement with the brake pressure plate. The pressure plate is moved through the pre-set clearance distance and, the instant that brake clamping is initiated by reason of a clamping force above the load cell threshold, a signal 146 is received in the controller 140 which begins a count of torque motor revolutions until that number of revolutions is reached which provides fifty percent brake clamping force. By the same token, if the pilot signal 152 indicates a requirement for one-hundred percent brake clamping, the controller 140 will continue to count torque motor rotor revolutions until that number is reached indicative of one-hundred percent brake clamping.

The alternative to a requirement for increased brake clamping is a requirement for decreased brake clamping. In this circumstance, the microprocessor controller 140 provides an output signal which reverses the polarity of the power-on signal 150 to the torque motor 102 such that the motor rotor revolutions are reversed and the reciprocating drive ram member is backed off from the brake pressure plate to the level of decreased brake clamping desired by the pilot signal 142. In this respect also, the controller 140 receives signals 144 from the antiskid command 134. The antiskid signal 144 is a brake release signal for antiskid braking and, therefore, it overrides any pilot generated signal 142. The controller 140 will effect an adjustment of the torque motor reverse rotation until the brake clamping force is reduced such that the motor position feedback signal 150 is equivalent to the sum of the pilot's pedal deflection signal 142 minus the antiskid signal 144 from the antiskid command 134.

Finally, it should be understood that the showing of the apparatus of FIG. 3 is of a single brake actuator 100. As illustrated in FIG. 2 of the drawings, plurality of such actuators will conventionally be used for braking of a single aircraft wheel. As alluded to earlier, there may be as many as eight, ten, or even more actuators 100 per wheel and brake assembly. Thus, the microprocessor controller 140 may have as many outputs 152 as there may be electric torque motors 102. In this respect also, the controller 140 may be configured to receive a single contact sensor means output signal 146 from any one of the plurality of actuators 100 which may be mounted on a single wheel, or alternatively, it may receive more than one signal 146 from multiple contact sensor means 136 on the same wheel. In any event, the microprocessor controller 140 will receive at least one signal 146 from each wheel and brake assembly while providing controlling power 150 to all torque motors 102 which may be associated with the brakes of an aircraft landing gear.

While certain representative embodiments and details have been shown for the purpose of illustrating the invention, it will be apparent to those skilled in the art that various changes and modifications may be made therein without departing from the spirit or scope of the invention.

What is claimed is:

1. An electrically controlled brake actuator for an aircraft multi-disk brake assembly comprising in combination:

a reciprocating drive mechanism operatively mounted to effect brake clearing and release of the multi-disk brake through a pressure plate of the assembly, the drive mechanism converting a rotational motion of one of its members to an axial translation of another member which is positioned for contacting engagement with the brake pressure plate;

gear drive means operatively mounted in association with the reciprocating drive mechanism to effect rotation of the one member;

an electrically responsive torque motor operatively mounted to work the gear drive means;

means operatively mounted in association with the torque motor to provide an electrical signal indicative of the motor rotor position at any instant in time;

means operatively mounted in association with the reciprocating drive mechanism to provide an electrical signal indicative of the initiation of a brake clamping force on the multi-disk brake;

means providing an electrical signal indicative of a pilot's command for wheel braking;

means providing an electrical signal indicative of brake release for antiskid braking; and a microprocessor controller including a counter calibrated to the number of torque motor rotor revolutions required to move the axially translating member of the reciprocating drive mechanism an axial distance equal to one-hundred percent brake clamping, said controller adapted to receive the signals indicative of (i) the motor rotor position, (ii) the initiation of brake clamping, (iii) a pilot's command for braking, and (iv) brake release for antiskid braking, to provide an output feedback signal to the torque motor which effects an adjustment of the motor position, in revolutions, to increase or decrease brake clamping in accordance with the pilot's command for braking and to effect brake release in accordance with an overriding command for antiskid braking.

2. The brake actuator as set forth in claim 1 wherein the means providing a signal indicative of the initiation of brake clamping comprises a contact switch means.

3. The brake actuator as set forth in claim 1 wherein the means providing a signal indicative of the initiation of brake clamping comprises a load cell.

4. The brake actuator as set forth in claim 3 wherein the load cell exhibits a force threshold calibrated to a preset clearance distance when brake clamping is released, the signal indicative of the initiation of brake clamping being given only upon the load cell threshold being exceeded.

5. The brake actuator as set forth in claim 4 wherein the load cell is mounted within the reciprocating drive mechanism in a position where a resistance to brake clamping may be detected.

6. The brake actuator as set forth in claim 4 wherein the load cell is mounted at the outboard end of the axially moving member of the reciprocating drive mechanism which makes contacting engagement with the brake pressure plate.

7. In an aircraft braking system including at least one landing gear wheel mounted in association with a brake disk stack of braking elements and a brake pressure plate to effect clamping of the disk stack for braking action, an electrically controlled brake actuator comprising in combination:

a source of electrical signals indicative of a pilot's command for braking;

a source of electrical signals indicative of commanded antiskid braking;

a reciprocating drive mechanism which converts a rotational motion of one member to a linear and axial motion of another member which is positioned for contacting engagement with the brake pressure plate;

gear means operatively mounted in association with the reciprocating drive mechanism to effect rotation of the one member;

an electrically responsive torque motor mounted to operatively engage the gear means;

a rotor position resolver operatively mounted in association with the torque motor to provide an electrical signal indicative of the motor rotor position at any instant in time;

a contact switch means operatively mounted in association with the reciprocating drive mechanism to provide an electrical signal indicative of an initiation of brake clamping of the brake disk stack; and a microprocessor controller including a counter calibrated to the number of torque motor rotor revolutions which are required to move the linearly and axially moving member of the reciprocating drive mechanism an axial distance equal to one-hundred percent brake clamping, said controller adapted to receive and analyze the signals indicative of (i) a pilot's command for braking, (ii) commanded antiskid braking, (iii) the torque motor rotor position, and (iv) the initiation of brake clamping, to generate an output feedback signal to the torque motor which adjusts the motor position, in rotor revolutions, to increase or decrease brake clamping in accordance with the pilot signal and to effect brake release in accordance with an overriding antiskid signal.

8. The brake actuator as set forth in claim 7 wherein the contact switch means comprises a load cell.

9. The brake actuator as set forth in claim 8 wherein the load cell exhibits a force threshold calibrated to a preset brake clearance when brake clamping is released, the signal indicative of an initiation of brake clamping being given only upon the load cell threshold being exceeded.

10. The brake actuator as set forth in claim 9 wherein the load cell is mounted to the linear and axially moving member of the reciprocating drive mechanism in a position where a resistance to brake clamping may be detected.

11. The brake actuator as set forth in claim 10 wherein the load cell is mounted in a position at the outboard end of the axially moving member which makes contacting engagement with the brake pressure plate.

12. The brake actuator as set forth in claim 10 wherein the load cell is mounted in a position at the inboard end of the member adapted for rotational motion.

* * * * *